United States Patent
Renno et al.

(10) Patent No.: US 7,689,640 B2
(45) Date of Patent: Mar. 30, 2010

(54) METHOD AND APPARATUS FOR FORMATTING NUMBERS IN MICROPROCESSORS

(75) Inventors: Erik K. Renno, Trondheim (NO);
Ronny Pedersen, Trondheim (NO);
Oyvind Strom, Trondheim (NO)

(73) Assignee: Atmel Corporation, San Jose, CA (US)

( * ) Notice: Subject to any disclaimer, the term of this patent is extended or adjusted under 35 U.S.C. 154(b) by 356 days.

(21) Appl. No.: 11/146,253

(22) Filed: Jun. 6, 2005

(65) Prior Publication Data

US 2006/0277244 A1    Dec. 7, 2006

(51) Int. Cl.
*G06F 7/38* (2006.01)

(52) U.S. Cl. .................. 708/552; 708/208; 708/209; 708/551

(58) Field of Classification Search ................ 708/208, 708/209, 551, 552
See application file for complete search history.

(56) References Cited

U.S. PATENT DOCUMENTS

| | | | |
|---|---|---|---|
| 4,814,976 A | 3/1989 | Hansen et al. .............. 711/201 |
| RE33,629 E | 7/1991 | Palmer et al. ............... 364/748 |
| 5,122,981 A | 6/1992 | Taniguchi ................... 364/748 |
| 5,204,832 A * | 4/1993 | Nakakura ................... 708/714 |
| 5,289,396 A | 2/1994 | Taniguchi ................... 364/737 |
| 5,373,459 A | 12/1994 | Taniguchi ............... 364/715.01 |
| 5,424,967 A * | 6/1995 | Lee ............................. 708/551 |
| 5,495,434 A | 2/1996 | Taniguchi ................... 364/769 |
| 5,497,340 A | 3/1996 | Uramoto et al. |
| 5,847,978 A * | 12/1998 | Ogura et al. ................. 708/552 |
| 5,881,257 A | 3/1999 | Glass et al. .................. 712/200 |
| 5,881,259 A | 3/1999 | Glass et al. .................. 712/210 |
| 5,881,263 A | 3/1999 | York et al. ................... 712/217 |
| 5,930,159 A * | 7/1999 | Wong ........................... 708/550 |
| 5,943,249 A | 8/1999 | Handlogten ............ 364/748.02 |
| 5,969,975 A | 10/1999 | Glass et al. .................. 708/490 |
| 6,002,881 A | 12/1999 | York et al. ..................... 712/34 |
| 6,209,017 B1 | 3/2001 | Lim et al. .................... 708/552 |
| 6,243,728 B1 * | 6/2001 | Farooqui et al. ............ 708/209 |
| 6,314,443 B1 | 11/2001 | Seal ............................. 708/552 |
| 6,571,268 B1 | 5/2003 | Giacalone et al. ........... 708/524 |
| 2002/0198918 A1 | 12/2002 | Steele, Jr. .................... 708/497 |
| 2003/0005012 A1 | 1/2003 | Steele, Jr. .................... 708/495 |

OTHER PUBLICATIONS

Website printout: ARM reference found at: http://www/arm.com/pdfs/QRC0001H_rvct_v2.1_arm.pdf, 6 pages.
Website printout: ARM reference found at: http://www/arm.com/pdfs/QRC0001H_rvct_v2.1_arm.pdf, 1 page.
Website printout: ARM saturating Instructions found at: http://www.amba.com/pdfs/DUI0204B_rvct_2_0_assembler.pdf, 5 pages.
"International Application Serial No. PCT/US06/19423, International Search Report mailed Jul. 6, 2007", 1 pg.
"International Application Serial No. PCT/US06/19423, Written Opinion mailed Jul. 6, 2007", 5 pgs.

* cited by examiner

*Primary Examiner*—Lewis A Bullock, Jr.
*Assistant Examiner*—Michael Yaary
(74) *Attorney, Agent, or Firm*—Schwegman, Lundberg & Woessner, P.A.

(57) ABSTRACT

An apparatus for scaling numbers comprises register means for storing an operand to be scaled, bit shifting means for performing a right shift operation on the operand, rounding means, and decision means to test for the existence of at least one of an overflow and an underflow condition.

6 Claims, 4 Drawing Sheets

Fig. _ 1

SATRNDS

Syntax:
satrnds Rd >>sa, bn

Operands:
d ∈ {0, 1, ..., 15}
{sa, bn} ∈ {0, 1, ..., 31}

| OPR# | OPERATION | DESCRIPTION |
|---|---|---|
| 21: | Temp ← Rd >> sa | Right shift operand Rd by sa bit positions and move to Temp |
| 22: | If sa != 0 | Check if rounding feature is enabled |
| 23: | Rnd=Rd[bn-1] | Set rounding value to most significant lost bit |
| 24: | Temp = Temp + Rnd; | Add rounding value to Temp |
| 25: | If ((Temp==SE(Temp[bn-1:0]))\|\|(bn==0)) | Check for overflow/underflow |
| 26: | Rd ← Temp;<br>else | Output result; it can be represented in bn+1 bits |
| 27: | if(Temp[31]==1) | Test for underflow |
| 28: | Rd ← -2$^{bn-1}$;<br>else | Scale to smallest representable number for case of underflow. |
| 29: | Rd ← 2$^{bn-1}$-1; | Scale to greatest representable number for case of overflow. |

Fig._2

SATRNDU

Syntax:
satrndu Rd >>sa, bn

Operands:
d ∈ {0, 1, ..., 15}
{sa, bn} ∈ {0, 1, ..., 31}

| OPR# | OPERATION | DESCRIPTION |
|---|---|---|
| 31: | Temp ← Rd >> sa | Right shift operand in Rd by sa bit positions and move to Temp |
| 32: | If sa != 0 | Check if rounding feature is enabled |
| 33: | Rnd=Rd[bn-1] | Set rounding value to most significant lost bit |
| 34: | Temp = Temp + Rnd; | Add rounding value to Temp |
| 35: | If ((Temp==ZE(Temp[bn-1:0]))\|\|(bn==0)) | Check for overflow/underflow |
| 36: | Rd ← Temp;<br>else | Output result; it can be represented in bn+1 bits |
| 37: | if(Temp[31]==1) | Test for underflow |
| 38: | Rd ← 0x0000_0000;<br>else | Output zero for case of underflow |
| 39: | Rd ← $2^{bn}-1$; | Scale to greatest representable number for case of overflow. |

METHOD AND APPARATUS FOR FORMATTING NUMBERS IN MICROPROCESSORS

TECHNICAL FIELD

The present invention is related to computer systems, and more specifically relates to arithmetic computations in microprocessors. In particular, the present invention provides an apparatus and a method for the reformatting and scaling of numbers.

BACKGROUND ART

Digital signal processing (DSP) is finding widespread use in modern computing applications. Formerly, digital signal processing operations were typically performed by dedicated processors with specialized instruction sets. There is an incentive to enable conventional microprocessors with the capability of performing efficient digital signal processing, thereby eliminating the need for a dedicated processor in a variety of applications.

Binary number representations are employed in microprocessors and digital signal processors. Intermediate calculations associated with digital signal processing operations often have greater accuracy (in terms of the number of bits employed to represent a number) than the operands. When calculations are complete, the result often has to be reformatted to the same precision as the original operands, or to some other required level of precision less than that of the intermediate calculation. The process of reformatting requires shifting the result a number of positions to the right to scale the value. Additionally, the scaled result may be checked for overflow and underflow with respect to the highest and lowest number that can be represented with the number of bits available to the formatted result. If the scaled result is larger than the greatest number that can be represented with the specified number of bits (i.e., an overflow condition), the scaled result is set to the greatest number that can be represented with the specified number of bits.

If the scaled result is smaller than the smallest number that can be represented with the specified number of bits (i.e., an underflow condition), the scaled result is set to the smallest number that can be represented with the specified number of bits. The operation of setting the scaled value upon an overflow and an underflow condition is referred to as saturation, or as a saturate operation. Skilled artisans will appreciate that saturation operations are known and employed in commercial microprocessor architectures. For example, the ARM 11, Version 6 microarchitecture family, available from ARM Ltd, Cambridge, England, provides two instructions, ssat and usat that perform signed and unsigned saturation respectively. However, the ssat and usat instructions provided by the ARM 11 microarchitecture do not provide a rounding capability (to be discussed infra). The absence of the rounding capability limits the usefulness of the ssat and the usat instructions.

A number scaled by right shifting biases the result by always producing a value that is always lower than or equal to the correct result. What is needed is a method for efficiently scaling the results of digital signal processing computations such as multiply-accumulate operations without producing a bias in the results. An efficient formatting method would significantly increase the performance of digital signal processing algorithms implemented in microprocessors and would avoid the need to perform a series of cumbersome operations to provide a scaled result without bias.

SUMMARY

The present invention presents a method and an apparatus for reformatting a number by scaling and rounding with a subsequent saturation check. Reformatting of both signed and unsigned numbers can be performed. By performing the rounding operation after the scaling operation, but before the saturation check, a biasing of the result is avoided. The methods embodied in the present invention enable the reformatting operation to be carried out with a single microprocessor instruction, thereby greatly increasing the execution speed of performance-critical digital signal processing applications.

The methods embodied in and various features of the present invention are presented for an exemplary embodiment incorporated in the Atmel® AVR32 32-bit RISC processor core, a commercial product. The AVR32 incorporates several instructions which utilize the present invention, comprising: satrnds (saturate with rounding signed), satrndu (saturate with rounding unsigned), mulsatrndhh.h (fractional signed multiply with rounding, return halfword), and mulsatrndwh.w (fractional signed multiply with rounding, return word).

DETAILED DESCRIPTION

Figure 1:
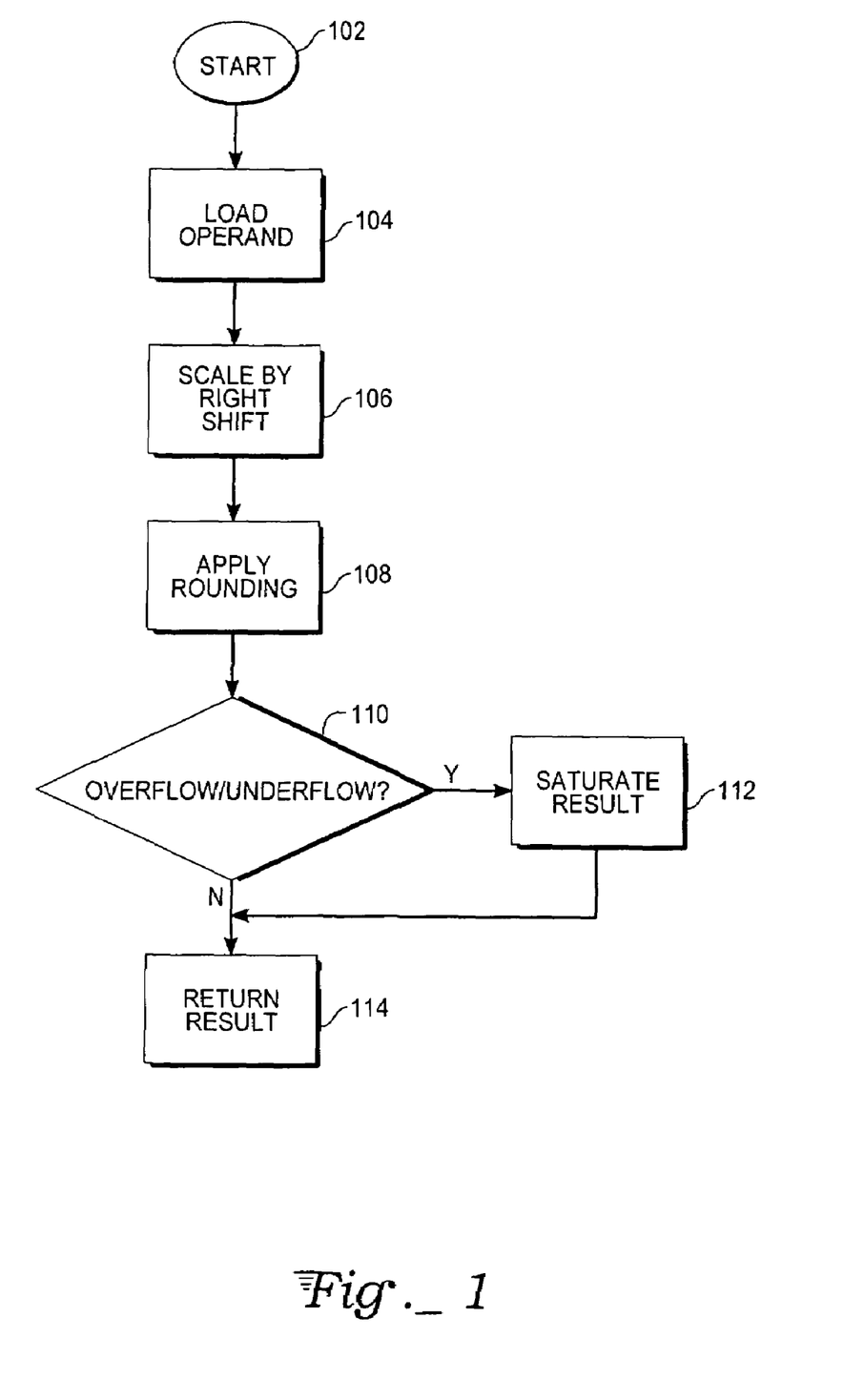
FIG. 1 illustrates a flow chart for formatting numbers according to an exemplary embodiment of the present invention.

Attention is directed to FIG. 1, a flowchart for formatting numbers according to an exemplary embodiment of the present invention in which start block 102 represents initiation of an instruction utilizing a reformatting operation. During the initiation, a number of bits to be applied to an operand shift amount (sa) and a number of bits allocated to a final representation of a formatted result (bn) may be specified. The loading of an operand to be reformatted is represented by a load operand block 104. In the exemplary embodiment, the operand is not restricted to a specific number of bits; the operand precision can vary in representation from one bit through 32 bits. Skilled artisans will recognize that the method is extensible to even larger bit numbers.

After completion of the operand load, the operand is scaled by performing a right shift operation, as represented by a scale by right shift block 106. The right shift operation comprises a shift of zero or more bits, according to the scaling desired. When performing the shift operation, the right shift block 106 preserves the operand sign by filling vacated bit positions with the sign bit of the operand.

A rounding operation is then applied to the scaled result, as represented by an apply rounding block 108. The rounding operation operates by examining the most significant bit shifted out of the operand. If the most significant bit shifted out is a "one," the scaled operand value is incremented by one. If the most significant bit shifted out is a "zero," the scaled operand value is unaltered. The apply rounding block 108 thereby eliminates bias in the scaled result. If a shift of zero bits is applied by the right shift block 106, then no rounding operation is performed by the apply rounding block 108. The operand is therefore unchanged from the value loaded by the load operand block 104. Saturation (to be explained infra) can be applied to the operand.

The scaled and rounded operand is then tested for overflow and underflow conditions by an overflow/underflow detection block 110. The overflow/underflow detection block 110 checks whether the scaled and rounded operand can be represented within the number of bits allocated (bn) to the formatted result. If an overflow or an underflow condition is detected, operation branches to a saturate result block 112.

If an overflow condition has occurred, the saturate result block 112 sets the scaled and rounded result equal to the maximum value that can be represented with the number of bits (bn) allocated to the formatted result. For an unsigned number, the maximum value capable of being represented with (bn) bits is $2^{bn}-1$; for a signed number the maximum value capable of being represented with bn bits is $2^{bn-1}-1$.

If an underflow has occurred, the saturate result block 112 sets the scaled and rounded result equal to the minimum value that can be represented with the number of bits allocated (bn) to the formatted result. For an unsigned number, the minimum value capable of being represented is zero; for a signed number the minimum value capable of being represented with bn bits is $-2^{bn-1}$.

If no overflow or underflow has occurred, operation progresses from the overflow/underflow decision block 110 to a return result block 114. If an overflow or underflow condition has occurred, operation progresses from the saturation result block to the return result block 114. The return result block may set certain flags; for example, to indicate the existence of a saturation condition.

PSEUDO-CODE EXAMPLES

The operation of the present invention can be further understood with reference to a first pseudo-code example of an algorithm for formatting a signed number. In the examples infra, bn represents a number of significant bits in a formatted result and sa represents a number of bit positions to scale (i.e., a sa number of right shift operations):

```
Temp ←Operand >> sa                                    (1)
if (perform_rounding and (Operand[sa−1] == 1))         (2)
    Temp ←Temp + 1                                     (3)
If ((Temp == SignExtend(Temp[bn−1:0])) || (bn==0))     (4)
    Result ←Temp                                       (5)
else
    if (Temp [MostSignificantBit] == 1)                (6)
        Result ←−2^(bn−1)                              (7)
    else
        Result ←2^(bn−1)−1                             (8)
```

In formula (1), an Operand is shifted right by sa bits and the resulting value moved into a variable Temp. Formula (2) tests whether a rounding operation is to be applied to the scaling operation and further tests the value of the most significant discarded bit from the operand, as given by Operand[sa−1]. If rounding is desired and the most significant discarded bit has a value of "one," control passes to formula (3) which adds one to the shifted value of the operand in the variable Temp.

Formula (4) provides a logical "or" test to determine whether either of two conditions are met. The first condition tests whether the value stored in the variable Temp is equal to the value stored in the variable Temp after a sign extend operation bringing the sign extended value to a length of bn bits. Skilled artisans will appreciate that the sign extend operation copies the sign bit of a signed number into all additional bits created during an expansion of the signed number into a larger bit representation. For example, to sign extend an 8-bit signed number to a 16-bit signed number, bit number seven (i.e., the sign bit) of the 8-bit signed number is copied into bits 8 . . . 15 of the 16-bit signed number.

Forumula (4) additionally tests for the second condition of bn having a value of zero. The assignment of the zero value to bn produces an alternative execution path in which no saturation is performed on the operand.

If the conditions tested by formula (4) are not met, then an overflow or an underflow condition has occurred and control passes to formulae (6)-(8), to be explained infra.

If the first condition tested by formula (4) is met, then the shifting and optional rounding detailed supra, result does not produce an overflow or an underflow condition and control passes to formula (5). If the second condition tested by formula (4) is met, saturation is not desired and control passes to formula (5) without explicitly testing the value stored in the variable Temp for overflow and underflow.

Formula (5) moves the value stored in the variable Temp to a variable Result without further operation. The value stored in the variable Result is the desired value for the formatted Operand. This is a first possible termination point for the signed number formatting algorithm.

Formula (6) tests whether the most significant bit of the value stored in the variable Temp is equal to a "one." If this condition is met the result is negative and an underflow has occurred. Control passes to formula (7) which sets the variable Result to the smallest signed number which can be represented with bn bits. This is a second possible termination point for the signed number formatting algorithm.

If the condition tested by formula (6) is not met, then an overflow condition has occurred. Control passes to formula (8) which sets the variable Result to the largest signed number which can be represented with bn bits. This is a third possible termination point for the signed number formatting algorithm.

The operation of the present invention can be further understood with reference to a second pseudo-code example of an algorithm for scaling an unsigned number:

```
Temp ←Operand >> sa                                    (9)
if (perform_rounding and (Operand[sa−1] == 1))         (10)
    Temp ←Temp + 1                                     (11)
If ((Temp == ZeroExtend(Temp[bn−1:0])) || (bn==0))     (12)
    Result ←Temp                                       (13)
else
    if (Temp [MostSignificantBit] == 1)                (14)
        Result ←0                                      (15)
    else
        Result ←2^(bn−1)                               (16)
```

In formula (9), an Operand is shifted right by sa bits and the resulting value moved into a variable Temp. Formula (10) tests whether a rounding operation is to be applied to the scaling operation and further tests the value of the most significant discarded bit from the operand, as given by Operand [sa−1]. If rounding is desired and the most significant discarded bit has a value of "one," control passes to formula (11) which adds one to the shifted value of the operand in the variable Temp.

Formula (12) provides a logical "or" test to determine whether either of two conditions are met. The first condition tests whether the value stored in the variable Temp is equal to the value stored in the variable Temp after a zero extend operation bringing the zero extended value to a length of bn bits. Skilled artisans will appreciate that the zero extend operation copies a zero into all additional bits created during an expansion of an unsigned number into a larger bit representation. For example, to zero extend an 8-bit unsigned number to a 16-bit unsigned number, zeros are copied into bits 8 . . . 15 of the 16-bit unsigned number.

Formula (12) additionally tests for the second condition of bn having a value of zero. The assignment of the zero value to bn produces an alternative execution path in which no saturation is performed on the operand.

If the conditions tested by formula (12) are not met, then an overflow or an underflow condition has occurred and control passes to formulae (14)-(16), to be explained infra.

If the first condition tested by formula (12) is met, then the shifting and optional rounding detailed supra result does not produce an overflow or an underflow condition and control passes to formula (13). If the second condition tested by formula (12) is met, saturation is not desired and control passes to formula (13) without explicitly testing the value stored in the variable Temp for overflow and underflow.

Formula (13) moves the value stored in the variable Temp to a variable Result without further operation. The value stored in the variable Result is the desired value for the scaled Operand. This is a first possible termination point for the unsigned number formatting algorithm.

Formula (14) tests whether the most significant bit of the value stored in the variable Temp is equal to a "one." If this condition is met, an underflow has occurred. Control passes to formula (15) which sets the variable Result to zero, the smallest unsigned number which can be represented with bn bits. This is a second possible termination point for the unsigned number formatting algorithm.

If the condition tested by formula (14) is not met, then an overflow condition has occurred. Control passes to formula (16) which sets the variable Result to the largest unsigned number which can be represented with bn bits. This is a third possible termination point for the unsigned number formatting algorithm.

Instruction Detail

Figure 2:
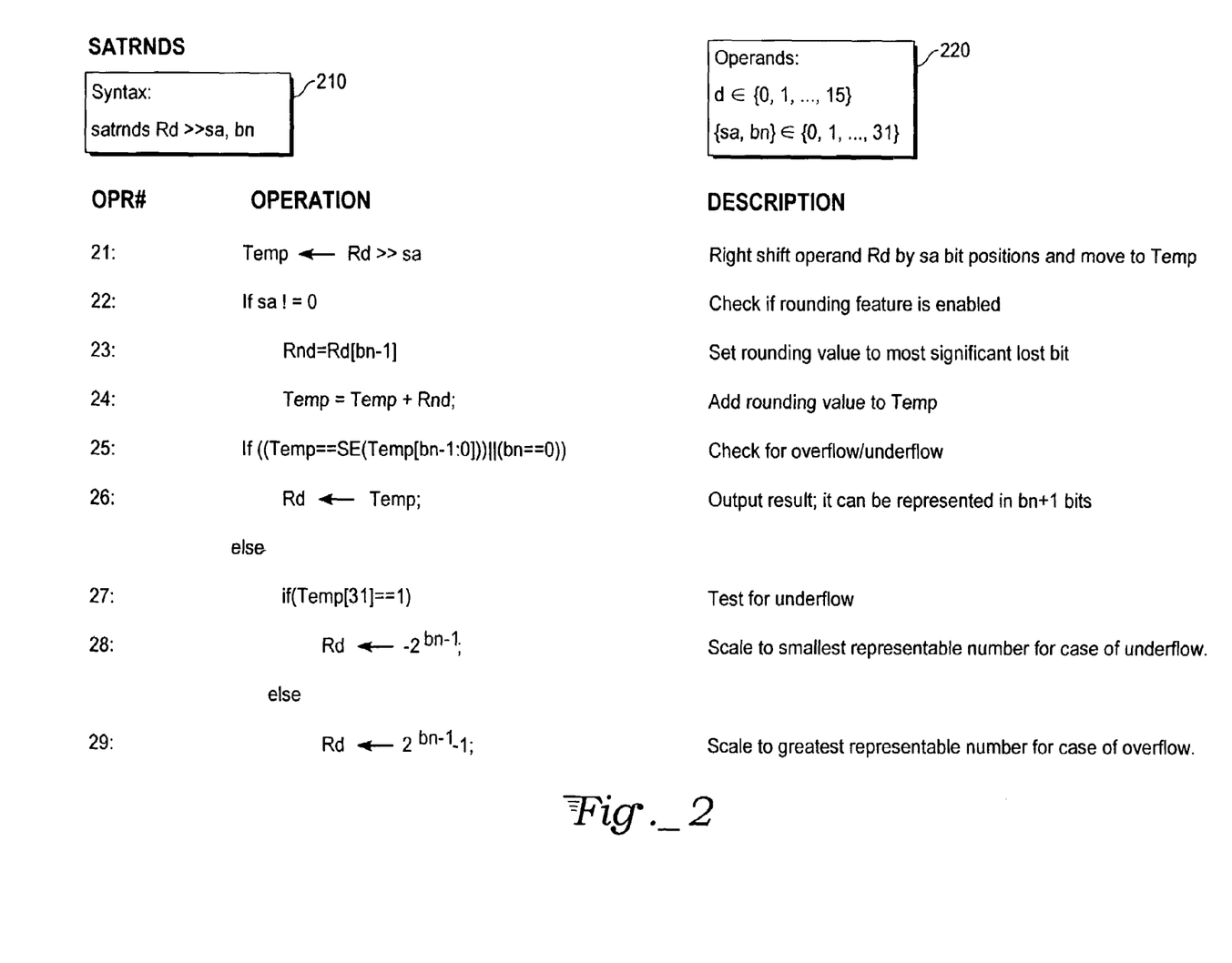
FIG. 2 is a code sequence for a saturate with rounding signed (SATRNDS) instruction according to an exemplary embodiment of the present invention.

The operation of an exemplary embodiment of the present invention will be further presented with reference to FIG. 2, a code sequence for saturate with rounding signed (SATRNDS) instruction for the Atmel® AVR32 32-bit RISC processor, comprising operation numbers (OPR#) 21 through 29. A SATRNDS syntax block 210 details the calling syntax for the SATRNDS instruction, comprising a mnemonic satrnds, a register Rd containing an operand, a shift amount sa (representing the number of shifts to be performed), and a bit number bn (representing the number of bits allocated to the result).

A SATRNDS operands block 220 details the allowable ranges for operands of the SATRNDS instruction. An operand d in the SATRNDS operands block 220 shares a correspondence with the register Rd in the SATRNDS syntax block 210, where Rd represents a 32-bit register number. For the example presented in FIG. 2, Rd can assume values R0 through R15.

Operation 21 performs a right shift of sa bits on the operand stored in the register Rd, and moves the result to a variable Temp. In an exemplary embodiment of the present invention, the variable Temp has 32 bits of precision. An alternate method for representing the variable Temp is Temp[31:0]. Operation 22 tests whether a constant sa is not equal to zero. In the exemplary embodiment, the constant sa is a constant comprising five bits contained within an instruction format for an instruction of type "SA immediate and single register"; a non-zero value for sa signifies that a rounding operation is to be performed as part of the scaling operation.

If the constant sa is zero, execution progresses to operation 25 explained infra. If the constant sa is not zero, operation 23 sets a variable Rnd equal to bit [bn−1] of the register Rd. Operation 24 adds the value contained in variable Rnd to the value contained in the variable Temp, completing the rounding operation.

Operation 25 performs a sign extension of the value stored in the variable Temp to bn bits, comparing the extended value to the original (non-extended) value. If the comparison produces a match, the shift and rounding operations have not produced an overflow or underflow condition and no saturation is required. Execution moves to operation 26. An additional feature of operation 25 tests whether the bit number bn equals zero. If bn equals zero, no saturation operation is applied after the shift and rounding, and execution moves to operation 26.

Operation 26 moves the result contained in the variable Temp back into the register Rn. This is a first possible termination point for the SATRNDS instruction.

Operation 27 tests the most significant bit of the variable Temp. If the most significant bit equals a "one" an underflow has occurred. Execution progresses to operation 28 which sets the value of the register Rd to the smallest signed number which can be represented by bn bits. This is a second possible termination point for the SATRNDS instruction.

If the condition tested by operation 27 is not met, an overflow condition has occurred. Execution progresses to operation 29 which sets the value of the register Rd to the largest signed number which can be represented by bn bits. This is a third possible termination point for the SATRNDS instruction.

Figure 3:
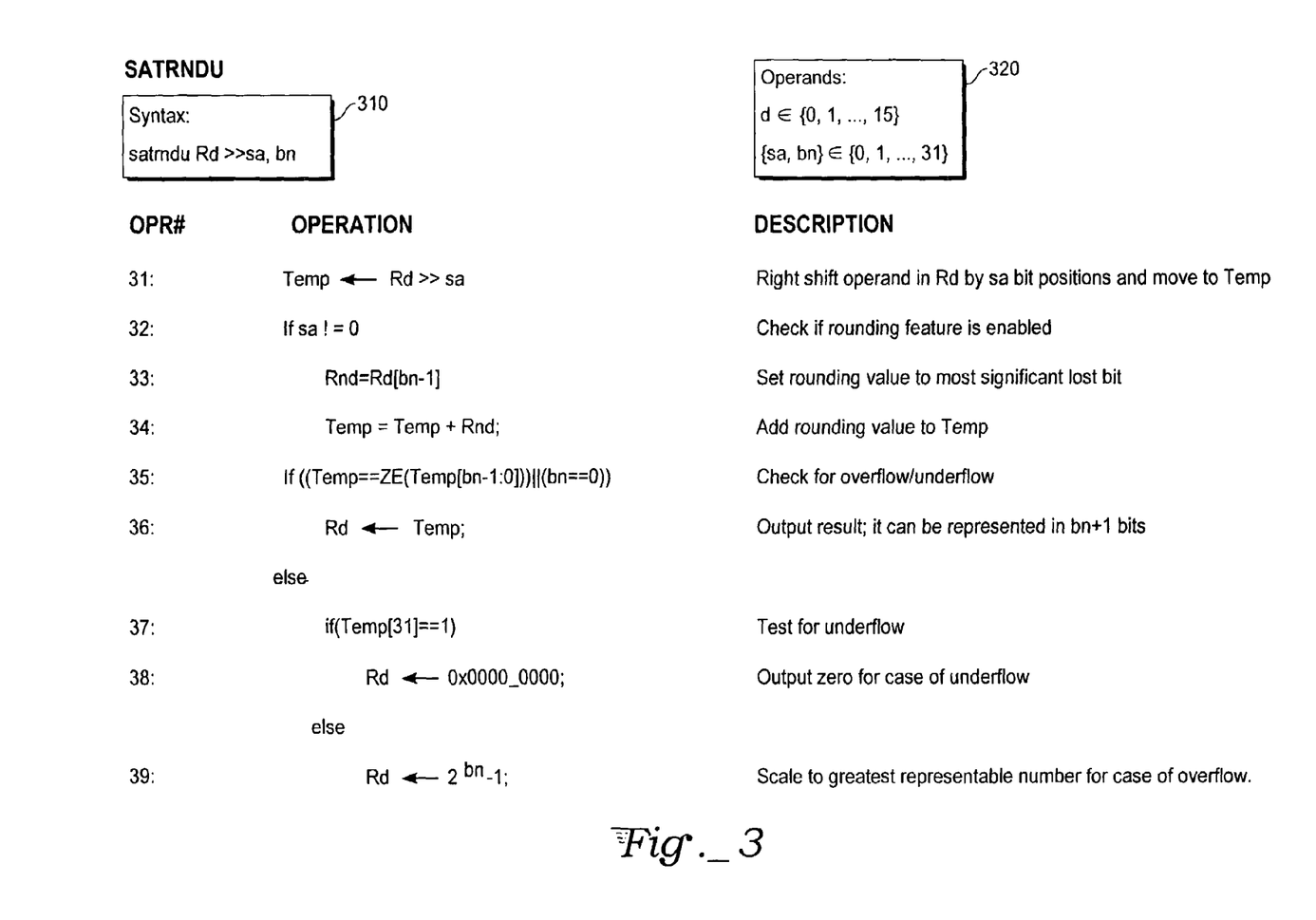
FIG. 3 is a code sequence for a saturate with rounding unsigned (SATRNDU) instruction according to an exemplary embodiment of the present invention.

Attention is now directed to FIG. 3, a code sequence for a saturate with rounding unsigned (SATRNDU) instruction as implemented in the Atmel® AVR32 32-bit RISC processor, comprising operation numbers (OPR#) 31 through 39. A SATRNDU syntax block 310 details the calling syntax for the SATRNDU instruction, comprising a mnemonic satrndu, the register Rd, the shift amount sa, and the bit number bn.

A SATRNDU operands block 320 details the allowable ranges for operands of the SATRNDU instruction.

Operation 31 performs a right shift of sa bits on the operand stored in the register Rd, and moves the result to the variable Temp. Operation 32 tests whether the constant sa is not equal to zero.

If the constant sa is zero, execution progresses to operation 35 explained infra. If the constant sa is not zero, operation 33 sets the variable Rnd to bit [bn−1] of the register Rd. Operation 34 adds the value contained in the variable Rnd to the value contained in the variable Temp, completing the rounding operation.

Operation 35 performs a zero extend of the value stored in the variable Temp to bn bits, comparing the extended value to the original (non-extended) value. If the comparison produces a match, the shift and rounding have not produced an overflow or underflow condition and no saturation is required. Execution moves to operation 36. An additional feature of operation 35 tests whether the bit number bn equals zero. If bn equals zero, no saturation operation is applied after the shift and rounding, and execution moves to operation 36.

Operation 36 moves the result contained in the variable Temp back into the register Rn. This is a first possible termination point for the SATRNDU instruction.

Operation 37 tests the most significant bit of the variable Temp. If the most significant bit equals a "one" an underflow has occurred. Execution progresses to operation 38 which sets the value of the register Rd to zero. This is a second possible termination point for the SATRNDU instruction.

If the condition tested by operation 37 is not met, an overflow condition has occurred. Execution progresses to operation 39 which sets the value of the register Rd to the largest unsigned number which can be represented by bn bits. This is a third possible termination point for the SATRNDU instruction.

Figure 4:
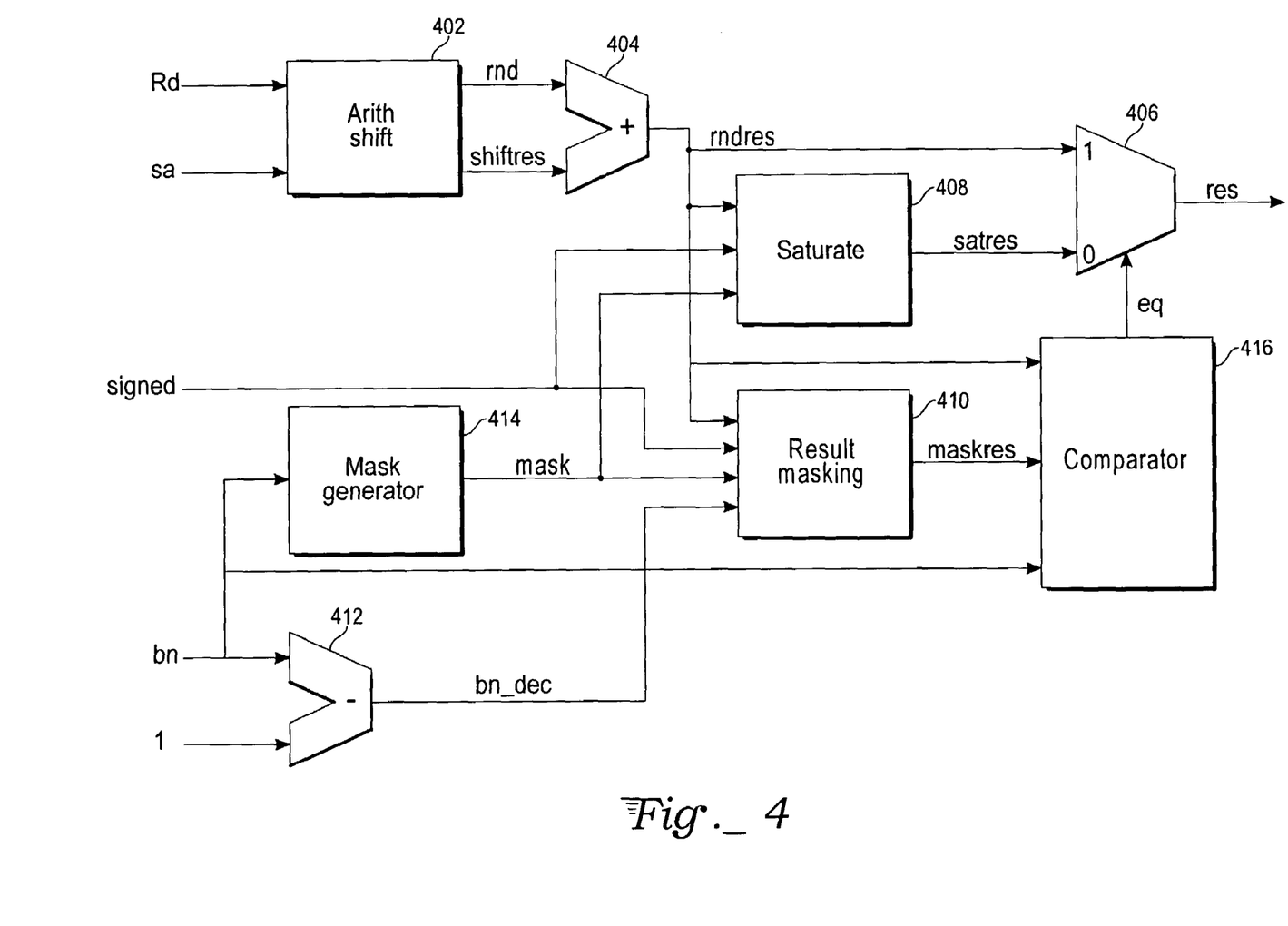
FIG. 4 is a hardware configuration for formatting numbers according to an exemplary embodiment of the present invention.

With reference to FIG. 4, a hardware configuration for formatting numbers according to an exemplary embodiment of the present invention comprises a plurality of logic blocks. An arithmetic shift block 402 has a first connection for accepting a 32-bit register value Rd and a second connection for accepting a shift amount value sa as inputs. The arithmetic shift block 402 further has a third connection for a rounding bit value rnd and a fourth connection for a shift result value shiftres as outputs. An input line, "signed," provides a determination whether the function satrnds or satrndu is performed. When a value of signed is equal to one (i.e., signed==1), satrnds is performed. When a value of signed is equal to zero (i.e., signed==0), satrndu is performed. Therefore, the "signed input" may be considered as synonymous with a "signed/unsigned result control signal," depending upon whether signed is equal to one or zero. For brevity of notation and a resultant increase in clarity, the term "signed" will be used hereinafter.

Further, skilled artisans will appreciate that FIG. 4 presents interconnects between logic blocks and that those interconnects are identified with names corresponding to the variables conveyed by those interconnects, the names further corresponding to connections on the various logic blocks.

The operation of the arithmetic shift block 402 can be understood with reference to the following pseudo-code construction:

```
    shiftres = signed(Rd>>sa)           (17)
    if ((sa!=0)&&Rd[sa−1])              (18)
        rnd=1                           (19)
    else
        rnd=0                           (20)
```

Formula (17) represents a right shift operation on the 32-bit register value Rd (i.e., the operand) by the shift amount value sa (i.e., by sa bits) to give the value shiftres. Formula (18) tests two conditions in a logical "and" combination: The first conditions tests whether the shift amount value sa is not zero. The second condition computes the most significant bit shifted out of the operand, as given by the construct "Rd[sa−1]." If both of these conditions are met, then rounding is required, and formula (19) is executed, setting the rounding bit value rnd equal to one.

If either of the conditions in formula (18) is not met, then rounding is not required, and formula (20) is executed, setting the rounding bit value rnd equal to zero.

An adder 404 has a first connection for accepting the rounding bit value rnd and a second connection for accepting the shift result value shiftres as inputs. The adder 404 combines the inputs to yield a rounded result value rndres as an output on a third connection according to the formula:

$$rndres = rnd + shiftres \qquad (21)$$

The rounded result value rndres is further passed by a rndres interconnect as a first input to a multiplexer 406, as a first input to a saturate logic block 408, as a first input to a result masking block 410, and as a first input to a comparator block 416.

A subtract block 412 has a first connection for accepting a bit number value bn and a second connection for accepting a constant value "one" as inputs. The subtract block 412 further has a third connection for a decremented bit number value bn_dec as an output.

The subtract block 412 combines the inputs to yield the decremented bit number value bn_dec according to the formula:

$$bn\_dec = bn - 1 \qquad (22)$$

The decremented bit number value bn_dec is passed by a bn_dec interconnect as a second input to the result masking block 410.

A mask generator block 414 has a first connection for accepting the bit number value bn as an input. The mask generator block produces a masking value mask on a second connection as an output according to the formula:

$$mask = 2^{bn} - 1 \qquad (23)$$

The masking value mask is passed by a mask interconnect as a second input to the saturate logic block 408, and as a third input to the result masking block 410.

A signed number flag bit value, signed, is passed by a signed interconnect as a third input to the saturate logic block 408 and as a fourth input to the result masking block 410. The operation of the mask generator block 414 and the result masking block 410 can be further understood with reference to the following pseudo-code construction:

```
    if(!signed)                          (24)
        maskres = rndres & mask          (25)
    else
        if(rndres[bn_dec])               (26)
            maskres = rndres | (~mask)   (27)
        else
            maskres = rndres&mask        (28)
```

Formula (24) tests the condition of the signed number flag bit value, signed. If signed is false (i.e., signed is equal to zero), the operation represented by formula (25) is performed in the result masking block 410. Formula (25) represents a logical "and" operation of the rounded result value rndres with the masking value mask, giving a result assigned to a mask application result value maskres as an output from the result masking block 410. The mask application result value maskres is passed by a maskres interconnect as a second input to the comparator block 416.

If the signed number bit flag value, signed, tested in formula (24) is true (i.e., signed is equal to one), execution progresses to formula (26). Formula (26) tests the value of a bit in the rounded result value, rndres, in the position corresponding to the decremented bit number value, bn_dec. This bit, represented by the construct rndres[bn_dec], corresponds to the most significant bit shifted out of the operand (i.e., the 32-bit register value Rd).

If the value of rndres[bn_dec] is one, execution progresses to formula (27) which performs a bitwise "or" operation on a first input comprising the rounded result value rndres and second input comprising a bitwise inversion of the masking value mask, represented by the construct (~mask). The output of the bitwise "or" operation in formula (27) is assigned to the mask application result value maskres.

If the value of rndres[bn_dec] is zero, execution progresses to formula (28) which performs a bitwise "and" operation on a first input comprising the rounded result value rndres and second input comprising the masking value mask. The output of the bitwise "and" operation in formula (28) is assigned to the mask application result value maskres.

The operation of the saturate logic block 408 can be further understood with reference to the following pseudo-code construction:

|  |  |
|---|---|
| if(!signed) | (29) |
|     if(rndres[31]) | (30) |
|         satres = 0 | (31) |
|     else |  |
|         satres = mask | (32) |
| else |  |
|     if(rndres[31]) | (33) |
|         satres = ~{0, mask[31:1]} | (34) |
|     else |  |
|         satres = {0, mask[31:1]} | (35) |

Formula (29) tests condition of the signed number flag bit value, signed. If signed is false (i.e., signed is equal to zero), the operation represented by formula (30) is performed in the saturate logic block 408. Formula (30) tests the value of a bit in position 31 for the rounded result value rndres. In the exemplary embodiment of the present invention, the rounded result value rndres is a 32-bit number, comprising bits zero through 31 and conventionally represented as rndres[31:0]. The notation rndres[31] represents the most significant bit of the rounded result value rndres.

If rndres[31] has a value of one, execution progresses to formula (31), which assigns zero to the saturated result value satres.

If rndres[31] has a value of zero, execution progresses to formula (32) which assigns the masking value mask to the saturated result value satres.

Attention is again directed to formula (29): If the signed number flag bit value, signed is true (i.e., signed is equal to one), the operation represented by formula (33) is performed in the saturate logic block 408. Formula (33) tests the value rndres[31]; if rndres[31] has a value of one, execution progresses to formula (34). Formula (34) assigns a value given by the construct ~{0, mask[31:1]} to the saturated result value satres, where "~" represents bitwise inversion, and {0, mask[31:1]} is a 32-bit result obtained by concatenating a 1-bit zero and bits [31:1] of the masking value mask.

If rndres[31] does not have a value of one, execution progresses to formula (35) which assigns the value {0, mask [31:1]} to the saturated result value satres.

The saturated result value satres is passed by a satres interconnect as a second input to the multiplexer 406 (FIG. 4). The bit number value bn is passed by the bn interconnect as a third input to the comparator block 416. The comparator block 416 further has a fourth connection for an equal flag bit value eq as an output.

The operation of the multiplexer 406 and the comparator block 416 can be further understood with reference to the following pseudocode:

|  |  |
|---|---|
| if((maskres==rndres) \|\| (bn==0)) | (36) |
|     eq = 1 | (37) |

-continued

|  |  |
|---|---|
| else |  |
|     eq = 0 | (38) |
| if(eq==1) | (39) |
|     res = rndres | (40) |
| else |  |
|     res = satres | (41) |

The operation represented by formula (36) is performed in the comparator block 416. Formula (36) performs a logical "or" test on two conditions. The first condition tests whether the mask application result value maskres is equal to the rounded result value rndres. The second condition tests whether the bit number value bn is equal to zero. If either of the two conditions tested by formula (36) is true, execution progresses to formula (37) which sets the equal flag bit value eq to one. If both conditions tested by formula (36) are false, execution progresses to formula (38) which sets the equal flag bit value eq to zero.

The equal flag bit value eq is passed by an eq interconnect as a third input to the multiplexer 406. This third input to the multiplexer 406 serves as a control which selects one of the first input and the second input to be routed to a fourth connection for a formatted result value res as an output.

The operation of the multiplexer 406 can be further understood with reference to the following pseudo-code:

|  |  |
|---|---|
| if(eq == 1) | (42) |
|     res = rndres | (43) |
| else |  |
|     res = satres | (44) |

Formula (42) tests the equal flag bit value eq. If the equal flag bit value eq is equal to one, execution progresses to formula (43) which assigns the rounded result value rndres to the formatted result value res. If the equal flag bit value eq is not equal to one, execution progresses to formula (44) which assigns the saturated result value satres to the formatted result value res.

Skilled artisans will appreciate in the description of FIG. 4, supra, that some elements of the internal workings of the logic blocks have not been presented to avoid obscuring the present invention. Further, the methods of implementing the elements not presented are well known to those skilled artisans. In the foregoing specification, the invention has been described with reference to specific embodiments thereof. It will, however, be evident to a skilled artisan that various modifications and changes can be made thereto without departing from the broader spirit and scope of the invention as set forth in the appended claims. For example, skilled artisans will appreciate that although the methods have been presented with reference to the Atmel® AVR32 32-bit RISC processor core, the methods are applicable to a variety of microprocessors and microcontrollers, including load/store architectures (popularly called RISC machines) and memory-oriented architectures (traditionally called CISC machines). Additionally, status flag modifications may be included into the method for scaling to provide information about the exact operations performed during a scaling process. The methods described in the specification supra may further be applied in the context of a specific microprocessor instruction dedicated specifically to a scaling operation, or alternately may be included as a portion of a more generalized instruction. Finally, skilled artisans will appreciate that the methods described need not be limited to any specific bit representations, and are extensible to numbers of higher precision than presented in the exemplary embodiment, for example, to 64-bit, 128-bit, or other numbers. The specification and drawings are, accordingly, to be regarded in an illustrative rather than a restrictive sense.

What is claimed is:

1. A method for providing a number formatting operation on an operand to produce a result value in a microprocessor, the method comprising:

performing a right shift operation on the operand by a shift amount, the shift amount comprising zero or more bit positions, to produce a shifted result;

computing a rounding value on the basis of the shift amount and a most significant bit shifted out of the operand, the method of computing the rounding value further comprising setting the rounding value to one if the shift amount is not equal to zero and the most significant bit shifted out of the operand is equal to one, and setting the rounding value to zero if either of the shift amount and the most significant bit shifted out of the operand equals zero;

setting a rounded result value equal to a sum of the rounding value and the shifted result;

computing a decremented bit number value by subtracting a value of one from a bit number;

computing a masking value equal to one less than a power of two raised to an exponent equal to the bit number;

computing a mask application result value on the basis of a signed number flag bit value and a bit position of the rounded result value, the bit position corresponding to the decremented bit number value, the method of computing the mask application result value further comprising:

if the signed number flag is zero, setting the mask application result value equal to a bitwise "and" operation on the rounded result and the masking value;

if the signed number flag is one and the bit position of the rounded result value corresponding to the decremented bit number value is a one, setting the mask application result value equal to a bitwise "or" operation on the rounded result and a bitwise inversion of the masking value; and if the signed number flag is one and the bit position of the rounded result value corresponding to the decremented bit number value is a zero, setting the mask application result equal value to a bitwise "and" operation on the rounded result and the masking value;

computing a saturated result value on the basis of the signed number flag bit value and a most significant bit position of the rounded result value, computing the saturated result value further comprising:

if the signed number flag is equal to zero and the most significant bit position of the rounded result value is equal to one, setting the saturated result value equal to zero;

if the signed number flag bit value is equal to zero and the most significant bit position of the rounded result value is equal to zero, setting the saturated result value equal to the masking value; and if the signed number flag bit value is equal to one and the most significant bit position of the rounded result value is equal to one, setting the saturated result value equal to a bitwise inversion of a concatenation of a 1-bit zero and a portion of the masking value excluding a least significant bit of the masking value;

if the signed number flag bit value is equal to one and the most significant bit position of the rounded result value is not equal to one, setting the saturated result value equal to the concatenation of the 1-bit zero and the portion of the masking value excluding the least significant bit of the masking value; and selecting the result value for the formatted operand, selecting further comprising:

if the mask application result value and the rounding result value are equal, setting the result value for the formatted operand equal to the rounding result value;

if the bit number is equal to zero, setting the result value for the formatted operand equal to the rounding result value; and if the mask application result value and the rounding result value are not equal and the bit number is not equal to zero, setting the result value for the formatted operand equal to the saturated result value.

2. An apparatus comprising:

an arithmetic shift register comprising an operand input coupled to receive an operand, a shift amount input coupled to receive a shift amount, a shifter result output configured to provide a shifted result and a rounding value output configured to provide a rounding value, the arithmetic shift register further configured to shift the operand input by the shift amount, giving the shifted result, the arithmetic shift register further configured to compute the rounding value by one of setting the rounding value equal to a most significant bit shifted out of the operand input and by setting the rounding value equal to zero;

an adder having a first adder input coupled to the shifter result output and a second adder input coupled to the rounding value output, the adder having a rounded result output configured to provide a rounded result, the rounded result being computed by summing the shifted result and the rounding value;

a subtract block comprising a bit number input coupled to receive a bit number and a decremented bit number output configured to provide a decremented bit number, the subtract block configured to subtract a value of one from the bit number to produce the decremented bit number, the decremented bit number output coupled to a result masking block, the result masking block comprising a first masking block input coupled to the rounded result output configured to provide the rounded result, a second masking block input coupled to receive a signed number bit, a third masking block input coupled to the mask value output, and a fourth masking block input coupled to the decremented bit number output, the result masking block further having a masked result output configured to provide a masked result value, the masked result value being equal to one of a bitwise "and" operation performed on the rounded result and the mask value, and a bitwise "or" operation performed on the rounded result and bitwise inversion of the mask value;

a mask generator block comprising a mask generator input coupled to receive the bit number and coupled to the subtract block bit number input, the mask generator block further having a mask value output configured to provide a mask value, the mask value being computed by subtracting a value of one from a power of two raised to an exponent equal to the bit number;

a saturate logic block comprising a first saturate input coupled to the rounded result output, a second saturate input coupled to receive the signed number bit and coupled to the second masking block input, a third saturate input coupled to the mask value output, and a saturated result output configured to provide a saturated result, the saturated result being equal to one of zero, the mask value, a bitwise inversion of a concatenation of a 1-bit zero and a portion of the mask value excluding a least significant bit of the mask value, and the concatenation of the 1-bit zero and the portion of the mask value excluding the least significant bit of the mask value;

a comparator comprising a first comparator input coupled to the rounded result output, a second comparator input coupled to the masked result output, and a third comparator input coupled to receive the bit number and coupled to the mask generator input and to the bit number subtract block bit number input, the comparator further having a comparator output configured to provide an eq value, the eq value being set to a value of one when the masked result value is equal to the rounded result, the eq value further being set to a value of one when the bit number is equal to zero, the eq value otherwise being set to a value of zero;

an output multiplexer having a first multiplexer input coupled to the rounded result output, a second multiplexer input coupled to the saturated result output, and a control input coupled to receive the value eq coupled to the comparator output, the output multiplexer further having a formatted result output configured to provide a value res, the output multiplexer configured to couple the rounded result output to the formatted result output when the value eq is equal to one, and further configured to couple the saturated result output to the formatted result output when the value eq is equal to zero.

3. A method to produce a value in a microprocessor, the method comprising:

performing a right shift operation on an operand by a shift amount to produce a shifted result, the shift amount being zero or more bit positions;

setting a rounding value to one if the shift amount is not equal to zero and a most significant bit shifted out of the operand is equal to one;

setting the rounding value to zero if either one of the shift amount and the most significant bit shifted out of the operand equals zero; and setting a rounded result value equal to a sum of the rounding value and the shifted result;

computing a decremented bit number value by subtracting a value of one from a bit number;

computing a masking value equal to one less than a power of two raised to an exponent equal to the bit number;

computing a mask application result value based on a signed number flag bit value and a bit position of the rounded result value corresponding to the decremented bit number value including:
 if the signed number flag is zero, setting the mask application result value equal to a bitwise "and" operation on the rounded result and the masking value;
 if the signed number flag is one and the bit position of the rounded result value corresponding to the decremented bit number value is a one, setting the mask application result value equal to a bitwise "or" operation on the rounded result and a bitwise inversion of the masking value; and
 if the signed number flag is one and the bit position of the rounded result value corresponding to the decremented bit number value is a zero, setting the mask application result equal value to a bitwise "and" operation on the rounded result and the masking value;

computing a saturated result value based on the signed number flag bit value and a most significant bit position of the rounded result value including:
 if the signed number flag is equal to zero and the most significant bit position of the rounded result value is equal to one, setting the saturated result value equal to zero;
 if the signed number flag bit value is equal to zero and the most significant bit position of the rounded result value is equal to zero, setting the saturated result value equal to the masking value;
 if the signed number flag bit value is equal to one and the most significant bit position of the rounded result value is equal to one, setting the saturated result value equal to a bitwise inversion of a concatenation of a 1-bit zero and a portion of the masking value excluding a least significant bit of the masking value; and
 if the signed number flag bit value is equal to one and the most significant bit position of the rounded result value is not equal to one, setting the saturated result value equal to the concatenation of the 1-bit zero and the portion of the masking value excluding the least significant bit of the masking value; and selecting a result value for a formatted operand including:
 if the mask application result value and the rounding result value are equal, setting the result value for the formatted operand equal to the rounding result value;
 if the bit number is equal to zero, setting the result value for the formatted operand equal to the rounding result value; and
 if the mask application result value and the rounding result value are not equal and the bit number is not equal to zero, setting the result value for the formatted operand equal to the saturated result value.

4. The method of claim 3, further comprising loading the operand into a register before performing the right shift operation on the operand.

5. The method of claim 3, wherein performing a right shift operation includes performing a right shift operation on a signed operand.

6. An apparatus comprising:
 an arithmetic shift register including:
  an operand input coupled to receive an operand;
  a shift amount input coupled to receive a shift amount;
  a shifter result output configured to generate a shifted result; and
  a rounding value output configured to generate a rounding value;
 wherein the arithmetic shift register is configured to:
  shift the operand by the shift amount to generate the shifted result; and
  compute the rounding value by one of setting the rounding value equal to a most significant bit shifted out of the operand input and by setting the rounding value equal to zero;
 an adder having a first adder input coupled to the shifter result output and a second adder input coupled to the rounding value output, the adder having a rounded result output configured to provide a rounded result, the rounded result being computed by summing the shifted result and the rounding value;
 a subtract block including a bit number input coupled to receive a bit number and a decremented bit number output configured to provide a decremented bit number, the subtract block configured to subtract a value of one from the bit number to produce the decremented bit number, the decremented bit number output coupled to a result masking block, the result masking block including a first masking block input coupled to the rounded result output configured to provide the rounded result, a second masking block input coupled to receive a signed number bit, a third masking block input coupled to the mask value output, and a fourth masking block input coupled to the decremented bit number output, the result masking block further having a masked result output configured to provide a masked result value, the masked result value being equal to one of a bitwise "and" operation performed on the rounded result and the mask value, and a bitwise "or" operation performed on the rounded result and bitwise inversion of the mask value;

a mask generator block including a mask generator input coupled to receive the bit number and coupled to the subtract block bit number input, the mask generator block further having a mask value output configured to provide a mask value, the mask value being computed by subtracting a value of one from a power of two raised to an exponent equal to the bit number;

a saturate logic block including a first saturate input coupled to the rounded result output, a second saturate input coupled to receive the signed number bit and coupled to the second masking block input, a third saturate input coupled to the mask value output, and a saturated result output configured to provide a saturated result, the saturated result being equal to one of zero, the mask value, a bitwise inversion of a concatenation of a 1-bit zero and a portion of the mask value excluding a least significant bit of the mask value, and the concatenation of the 1-bit zero and the portion of the mask value excluding the least significant bit of the mask value;

a comparator including a first comparator input coupled to the rounded result output, a second comparator input coupled to the masked result output, and a third comparator input coupled to receive the bit number and coupled to the mask generator input and to the bit number subtract block bit number input, the comparator further having a comparator output configured to provide an eq value, the eq value being set to a value of one when the masked result value is equal to the rounded result, the eq value further being set to a value of one when the bit number is equal to zero, the eq value otherwise being set to a value of zero; and an output multiplexer having a first multiplexer input coupled to the rounded result output, a second multiplexer input coupled to the saturated result output, and a control input coupled to receive the value eq coupled to the comparator output, the output multiplexer further having a formatted result output configured to provide a value res, the output multiplexer configured to couple the rounded result output to the formatted result output when the value eq is equal to one, and further configured to couple the saturated result output to the formatted result output when the value eq is equal to zero.

* * * * *

UNITED STATES PATENT AND TRADEMARK OFFICE
CERTIFICATE OF CORRECTION

PATENT NO. : 7,689,640 B2 Page 1 of 1
APPLICATION NO. : 11/146253
DATED : March 30, 2010
INVENTOR(S) : Erik K. Renno et al.

It is certified that error appears in the above-identified patent and that said Letters Patent is hereby corrected as shown below:

In column 4, line 10, delete "Forumula" and insert -- Formula --, therefor.

In column 4, line 57, delete "$2^{bn-1}$" and insert -- $2^{bn}-1$ --, therefor.

Signed and Sealed this

Eighth Day of June, 2010

David J. Kappos
*Director of the United States Patent and Trademark Office*